(12) United States Patent
Tran et al.

(10) Patent No.: US 11,263,336 B2
(45) Date of Patent: Mar. 1, 2022

(54) SYSTEMS AND METHODS FOR PROVIDING NETWORK-BASED PERMISSIONING USING SECURITY NODE HASH IDENTIFIERS

(71) Applicant: Palantir Technologies Inc., Palo Alto, CA (US)

(72) Inventors: Lam Tran, Menlo Park, CA (US); James Baker, London (GB); Lili Yang, San Mateo, CA (US)

(73) Assignee: Palantir Technologies Inc., Denver, CO (US)

( * ) Notice: Subject to any disclaimer, the term of this patent is extended or adjusted under 35 U.S.C. 154(b) by 163 days.

(21) Appl. No.: 16/733,415

(22) Filed: Jan. 3, 2020

(65) Prior Publication Data

US 2021/0124835 A1    Apr. 29, 2021

Related U.S. Application Data

(60) Provisional application No. 62/927,218, filed on Oct. 29, 2019.

(51) Int. Cl.
| | | |
|---|---|---|
| *G06F 21/62* | (2013.01) |
| *G06F 21/60* | (2013.01) |
| *H04L 9/06* | (2006.01) |
| *H04L 41/22* | (2022.01) |
| *H04L 29/06* | (2006.01) |

(52) U.S. Cl.
CPC ........ *G06F 21/6218* (2013.01); *G06F 21/602* (2013.01); *H04L 9/0643* (2013.01); *H04L 41/22* (2013.01); *H04L 63/20* (2013.01)

(58) Field of Classification Search
CPC .............. G06F 21/6218; G06F 21/602; G06F 2221/2141; G06F 2221/2145; G06F 21/604; H04L 9/0643; H04L 41/22; H04L 63/20
See application file for complete search history.

(56) References Cited

U.S. PATENT DOCUMENTS

| | | |
|---|---|---|
| 9,229,952 B1 | 1/2016 | Meacham et al. |
| 9,888,039 B2 | 2/2018 | Elliot et al. |
| 10,362,064 B1 | 7/2019 | Elliot et al. |
| 10,706,166 B1 * | 7/2020 | Mandadi ............... G06F 16/213 |

(Continued)

FOREIGN PATENT DOCUMENTS

| | | |
|---|---|---|
| EP | 3188069 B1 | 3/2020 |
| EP | 3816832 A1 | 5/2021 |

*Primary Examiner* — Meng Li
(74) *Attorney, Agent, or Firm* — Faegre Drinker Biddle & Reath LLP

(57) ABSTRACT

Systems and methods generate a first security node hash identifier by performing a first hash operation, such as a one-way hash, on a first data resource identifier associated with a first data resource, such as a data set, produced by a data resource platform. The systems and methods generate a dependent second security node hash identifier by performing a second hash operation on a second data resource identifier associated with a dependent second data resource produced by the data resource platform and on the first security node hash identifier, receive an access request for access to the dependent second data resource; and in response to the access request, grant permission to access the dependent second data resource to a user associated with the access request based on the dependent second security node hash identifier.

20 Claims, 6 Drawing Sheets

(56) References Cited

U.S. PATENT DOCUMENTS

| | | |
|---|---|---|
| 2007/0162463 A1 | 7/2007 | Kester et al. |
| 2011/0093915 A1* | 4/2011 | Le Coq ............... G06F 21/6218 |
| | | 726/1 |
| 2011/0302413 A1 | 12/2011 | Arroyo et al. |
| 2017/0249453 A1* | 8/2017 | Voigt .................. G06F 21/6218 |
| 2017/0359379 A1* | 12/2017 | Elliot ...................... H04L 63/08 |
| 2018/0145983 A1 | 5/2018 | Bestler |
| 2019/0289036 A1 | 9/2019 | Elliot et al. |
| 2020/0110684 A1* | 4/2020 | Hu ........................ H04L 9/0643 |

\* cited by examiner

SYSTEMS AND METHODS FOR PROVIDING NETWORK-BASED PERMISSIONING USING SECURITY NODE HASH IDENTIFIERS

1. CROSS REFERENCE TO RELATED APPLICATIONS

This application claims priority to U.S. Provisional Application No. 62/927,218, filed Oct. 29, 2019, incorporated by reference herein for all purposes.

2. BACKGROUND

Certain embodiments of the present disclosure are directed to user permissioning systems. More particularly, some embodiments of the present disclosure provide systems and methods for providing networked-based permissioning for a data resource platform.

Typical computer systems include a file system to control how data is stored and retrieved. Conventional file systems maintain information regarding user access permission in conjunction with each stored resource to control users' ability to access the resources. For example, one user may be permitted to view and change a particular resource while another user may only be permitted to view the resource. In some instances, multiple application programs may share common access to resources included in a single file system. For example, a suite of network applications may provide a common interface that provides a user with various related functionalities that allow the user to interact with a common repository of data objects shared by the application suite. In these instances, each application program is typically responsible for evaluating whether a user has permission to access a resource included in the file system based on the user access permission information maintained along with the resource. Not only does this conventional implementation lead to painstaking redundancies in development of such an application, but this also presents the potential for inconsistent handling of user access permissions across each of the applications.

Network-based permissioning systems can serve as a centralized permissioning system for data processing platforms to evaluate access permissions of users of the network system with respect to resources, such as raw data and/or data sets derived from the raw data, stored in one or more data resource databases. Some network-based permissioning systems maintain a data structure representing a data resource's hierarchy in the form of a hierarchy resource graph of nodes that is updated to reflect new or updated permission policies. Each node in the resource graph represents data resources, such as data sets. The hierarchy resource graph represents an inheritance chain of data resources. An effective permission policy is maintained for each data resource because a data object, also referred to as a policy object representing the policy, includes individual policy information for each node of the entire hierarchical tree such that the policy object contains all information that is needed to determine a user's access permission with respect to a particular data resource.

However, as more and more transforms (e.g., transactions) are used to produce dependent data sets, the number of nodes in the hierarchical resource graph can increase to hundreds of thousands of nodes requiring evaluation of permissions associated with many nodes. This results in inefficient security access to data sets or other resources and increased processing by the network-based permissioning systems.

Hence it is highly desirable to improve the technique for providing network-based user permissioning for access to resources.

3. SUMMARY

Certain embodiments of the present disclosure are directed to user permissioning systems. More particularly, some embodiments of the present disclosure provide systems and methods for providing networked-based permissioning for a data resource platform using hash-based security node hash identifiers.

According to some embodiments, a system generates a first security node hash identifier by performing a first hash operation, such as a one-way hash, on a first data resource identifier associated with a first data resource, such as a data set, produced by a data resource platform. In certain embodiments, the system generates a dependent second security node hash identifier by performing a second hash operation on a second data resource identifier associated with a dependent second data resource produced by the data resource platform and on the first security node hash identifier, receives an access request for access to the dependent second data resource; and in response to the access request, grants permission to access the dependent second data resource to a user associated with the access request based on the dependent second security node hash identifier.

According to some embodiments, a method for providing network-based permissioning for a data resource platform includes generating a first security node hash identifier by performing a first hash operation, such as a one-way hash operation, on at least a first data resource identifier, such as a container identifier, associated with a first data resource, such as a data set, produced by the data resource platform. The method includes generating a dependent second security node hash identifier by performing a second hash operation on a second data resource identifier associated with a dependent second data resource and on at least the first security node hash identifier, the dependent second data resource being produced by the data resource platform using at least the first data resource as at least one parent data resource. The method includes receiving an access request for access to the dependent second data resource and in response to the access request, granting permission to access the dependent second data resource to a user associated with the access request based at least in part on the dependent second security node hash identifier. The method is performed by one or more processors.

According to certain embodiments, a non-transitory machine-readable medium includes executable instructions that when executed by one or more processors cause the one or more processors to generate a first security node hash identifier by performing a first hash operation on at least a first data resource identifier associated with a first data resource produced by the data resource platform and generating a dependent second security node hash identifier by performing a second hash operation on a second data resource identifier associated with a dependent second data resource and on at least the first security node hash identifier, the dependent second data resource being produced by the data resource platform using at least the first data resource as at least one parent data resource. The non-transitory machine-readable medium includes executable instructions that when executed by one or more processors cause the one or more processors to receive an access request for access to the dependent second data resource and in response to the access request, grant permission to access the dependent second data resource to a user associated with the access request, based at least in part on the dependent second security node hash identifier.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein.

Figure 5:
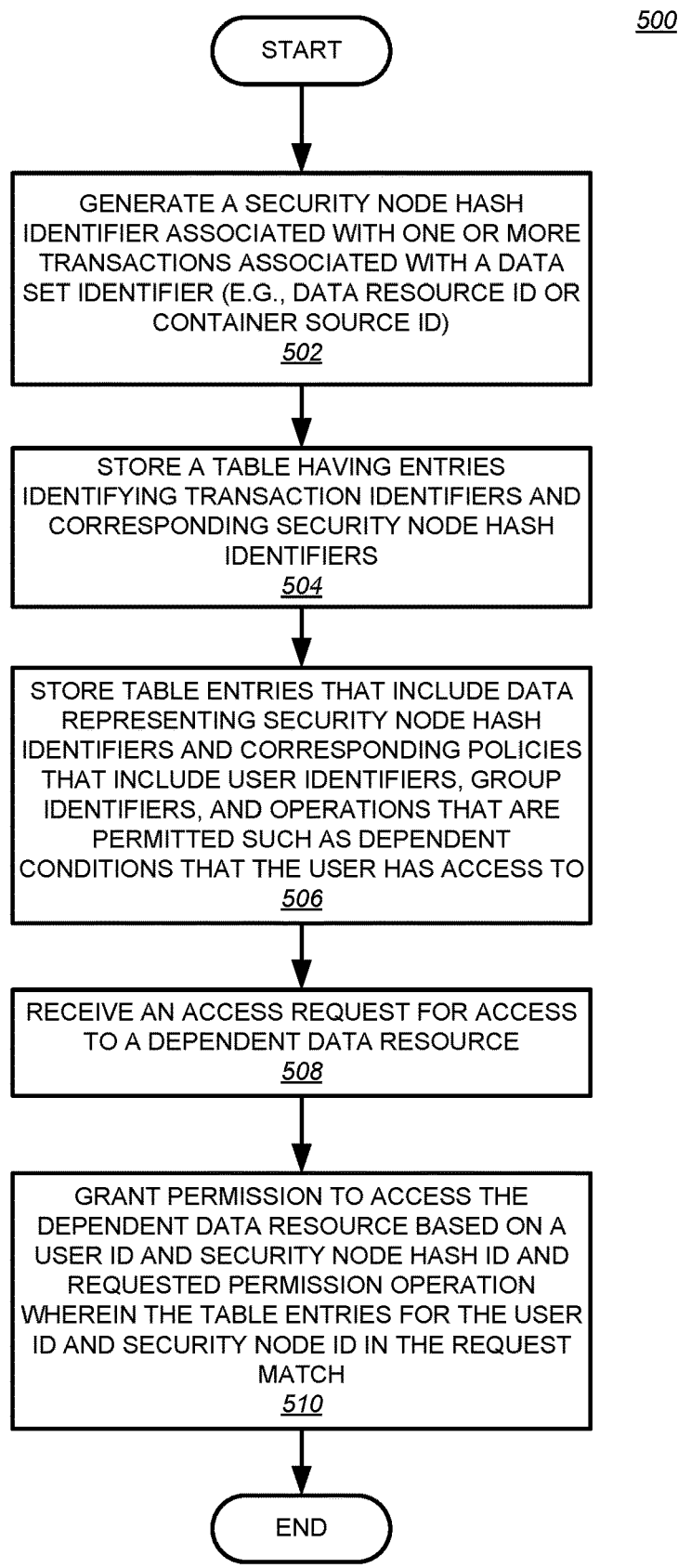
Figure 6:
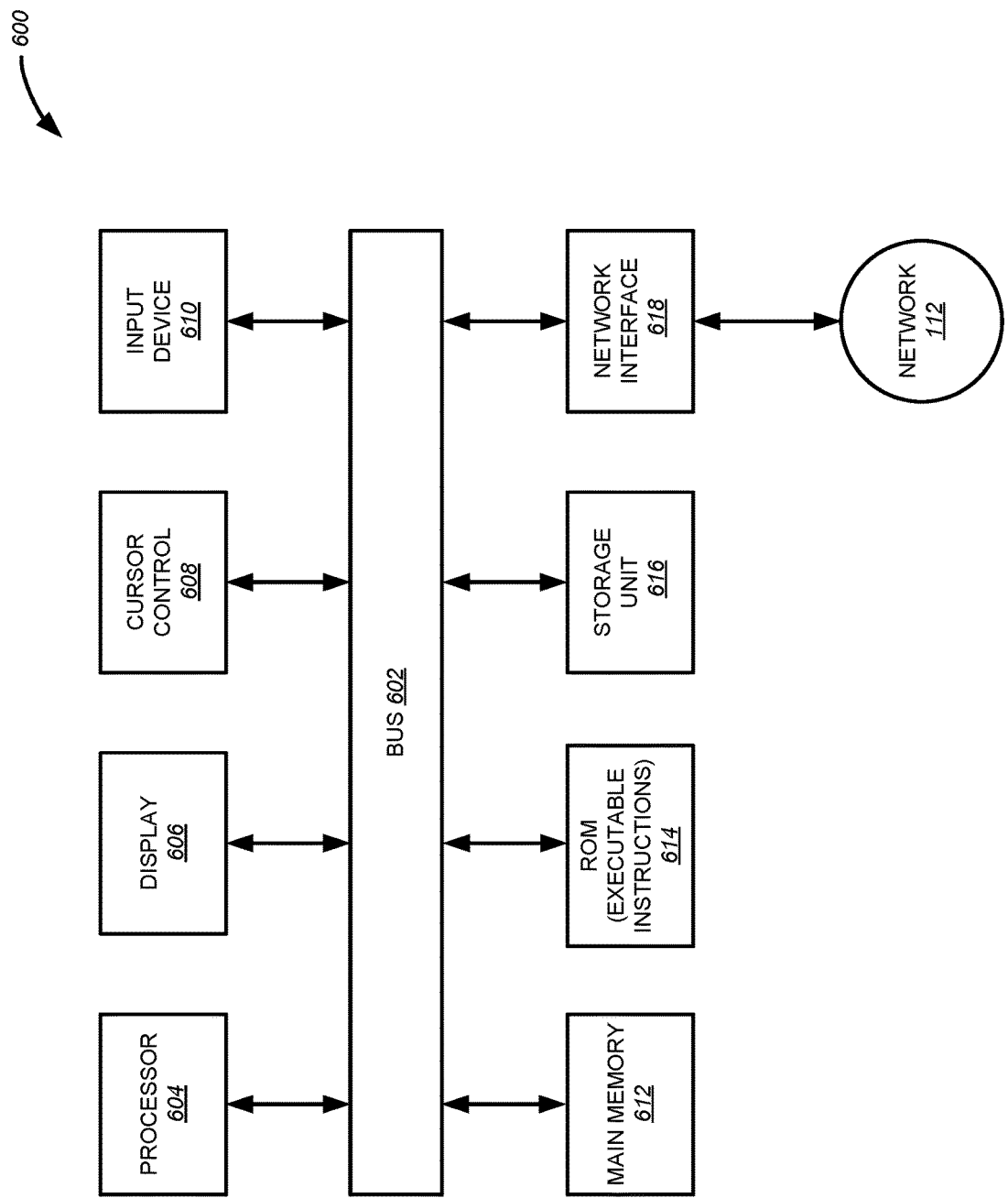

FIG. 5 is a flowchart illustrating a method for providing network-based permissioning using security node hash identifiers in accordance with an example set forth in the disclosure; and FIG. 6 is a diagrammatic representation of a machine in the example form a computer system within which a set of instructions for causing the machine to perform any one or more of the methodologies discussed herein may be executed.

5. DETAILED DESCRIPTION

Example embodiments relate to a network-based permissioning system and methods for managing access permissions associated with data resources. A "data resource" as used herein may include any item of data or code (e.g., a data object, data set, resource locator) that can be used by one or more computer programs. In example embodiments, data resources are stored in one or more network databases and are capable of being accessed by applications hosted by servers that share common access to a network database. In some embodiments, a network-based permissioning system employs a more compact hierarchy resource graph that includes security nodes, that have security node hash identifiers, that aggregate common security across many transactions (e.g., transactions that produce data sets).

In some embodiments, benefits include significant improvements, including for example, a decrease in response time by the computing platform to provide access to data resources. In certain embodiments decreased processor usage can occur compared to prior systems which can result in reduced system degradation and improved power savings. In some embodiments increased network communication efficiency can result along with other technical benefits. In some implementations, each security node (e.g., security node hash identifier) summarizes the security of a particular data resource. In some examples, a stored security node graph representation does not grow with every transaction or group of transactions that result in a new data set. In some examples, the stored security node graph is similar to a hash-tree/Merkle-tree and each security node is uniquely defined by its hash value.

In certain embodiments, one or more solutions rooted in computer technology overcome one or more problems specifically arising in the realm of computer technology. Some embodiments are directed to computing platforms that include workspace servers that provide access to applications to client devices through a browser-based user interface. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

Figure 1:
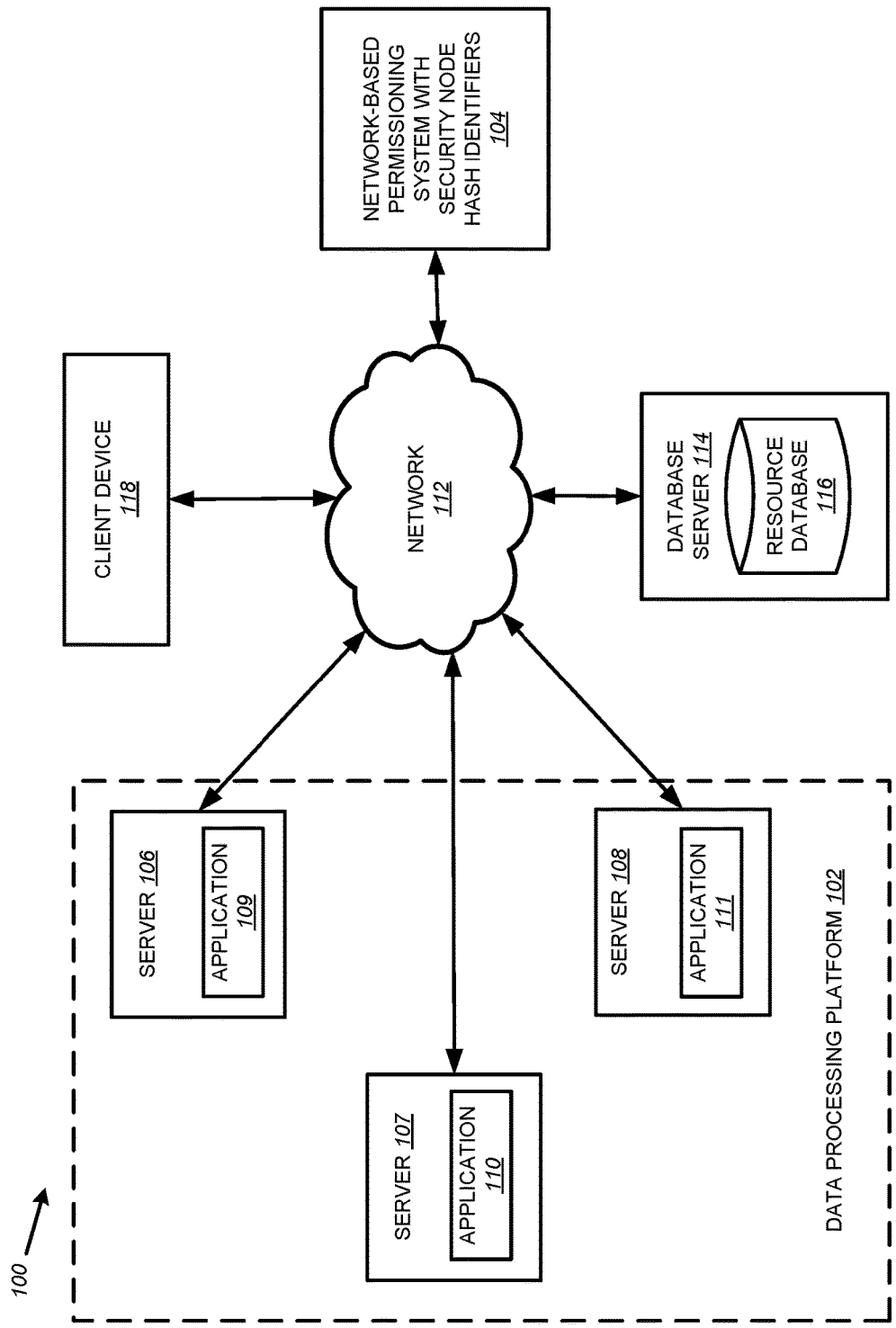
FIG. 1 is a network diagram depicting a network system including a group of application servers in communication with a network-based permissioning system configured for evaluating access rights for data resources commonly accessed by the group of application servers, according to an example embodiment.

FIG. 1 is a network diagram depicting a network system 100 including a data processing platform 102 in communication with a network-based permissioning system 104 configured for registering and evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 are in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

To access data resources from the resource database 116, the servers 106-108 transmit access requests via the network 112 to the network-based permissioning system 104. An access request includes a data resource identifier and a user identifier corresponding to a user (also referred to herein as a "requesting user") who is utilizing one of the applications 109-111 to access to the data resource (also referred to herein as a "requesting application"). The network-based permissioning system 104 may include an application programming interface (API) or other machine interface to receive such access requests from the server 106-108 hosting the requesting application 109-111.

In some implementations, the network-based permissioning system 104 uses a cryptographic hash operation to generate security node hash identifiers that represent a combination of approved security levels for dependent security permissions across dependent data sets (e.g., data resources in the hierarchical resource graph) and the security node hash identifiers are linked to effective security policies associated with a data set. In certain implementations, security nodes are placed in node hierarchy graphs wherein the security nodes aggregate common security across many transactions through a hash tree mechanism and for permission purposes, the network-based permissioning system 104 uses hash-based security node hash identifiers to determine whether a user has the requested permission. In some implementations, a container resource identifier, such as a data set ID, is employed and all other resources under that container share the same security node if and only if they share the same dependencies. In certain implementations, the networked based permissioning system 104 serves as a centralized permissioning system for the data processing platform 102 to evaluate access permissions of users of the network system 100 with respect to data resource stored in the resource database 116 or elsewhere. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

As shown, the network system 100 also includes a client device 118 in communication with the data processing platform 102 and the network-based permissioning system 104 over the network 106. The client device 118 communicates and exchanges data with the data processing platform 102

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

According to some embodiments, the data processing platform 102 includes a container-orchestration platform. In some examples, the container-orchestration platform allows for automated deployment, scaling and/or operations of containers across the platform. For example, the container-orchestration platform employs the containers across one or more instances of the computing platform 103.

According to certain embodiments, a container of the data processing platform 102 includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the data processing platform 102. In one example, the micro-service includes the one or more applications, libraries and the applications' dependencies.

Figure 2:
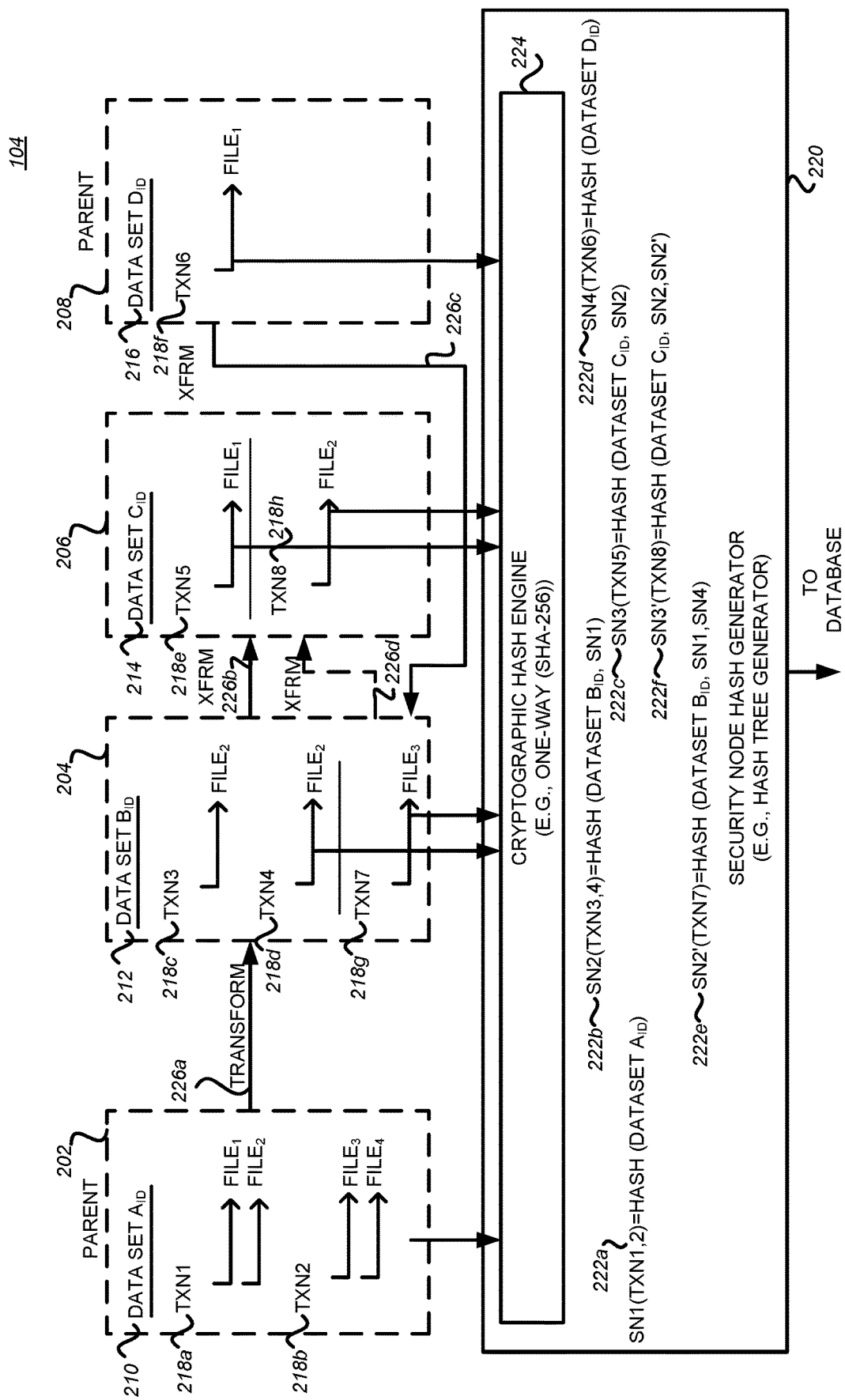
FIG. 2 is a diagram illustrating one example of generating security node hash identifiers using a security node hash generator according to an example set forth in the disclosure.

FIG. 2 illustrates an embodiment of the network-based permissioning system 104 that in this example, provides cryptographic hashes corresponding to security nodes (e.g., also referred to as permission nodes) in a resource node hierarchy. In some implementations, users are provided permission to dependent data sets (e.g., dependent nodes in the resource node hierarchy) only if they have permission to the original or parent data set (e.g., root node in the hierarchy). In some implementations, the policy for a root node for a particular user is maintained through linking to a security node hash ID generated from dependent nodes. In some implementations, the policy for dependent nodes is inherited from the root nodes from which the dependent nodes are derived.

As illustrated in the example of FIG. 2, a plurality of containers 202-208 (e.g., corresponding to nodes in a resource node tree) are designated by differing data resource identifiers 210-216, such as container resource identifiers or other identifiers also referred to in this example as data set identifiers as applied to data sets. Each container 202-208 includes unique transaction identifiers 218*a*-218*h* (also referred to as transactions) and resulting files (e.g., resource locators) containing data from data resources in the data resource platform that have been analyzed or generated through transform operations or other operations resulting in a data set for which users are granted permission to perform various operations on. In this example, a security node hash generator 220 generates for each transaction or group of transactions, a security node hash identifier (ID) 222*a*-222*f* which includes performing in one example, a one-way hash operation using a cryptographic hash engine 224 on the data resource IDs 210-216 (e.g., DATA SET A ID, DATA SET B ID, DATA SET C ID AND DATA SET D ID) and any dependent security node hash identifiers as described below.

In an example a transaction is a writing of data to another data set. Where each transaction (e.g., resource locator), or group of transactions, has a security node, the process works as follows. A raw data set identified by data resource ID 210 (e.g., DATA SET ID A, the parent container ID) with no dependencies, and a transaction(s), such as transactions TXN1 218*a* and TXN2 218*b* under it will have a security node with a security node hash ID 222*a* (SN1) that consists of just the hash of the data resource identifier 210, DATA SET A ID. In other words, the security of each of those transactions is the same as the data set it belongs under. A derived (e.g., dependent) data set (e.g., a child container), such as one derived through one or more transform operations 226*a*, is shown as having data resource identifier 212, DATA SET B ID (e.g., generated via transactions 218*c* and 218*d*) which has a dependency on the raw data set, DATA SET A ID in container 202, will have a security node hash ID 222*b* (SN2) that consists of a hash of the derived data set container resource identifier 212 and the security node hash ID 222*a* of the raw data set. In other words, a user will not be denied access if that user also has access to the raw data set and the derived data set. If another transaction, for example transaction TXN7 218*g*, on the derived data set DATA SET B ID, is based on a transaction TXN6 from a different parent container 208 (e.g., different data set 216, DATA SET D ID) then the generated security node hash ID 222*e* will be different from the security node hash ID 222*b* for the derived data set. As such, the creation of a new security node hash ID 222*e* occurs. In some examples the security node hash identifiers 222*a*-222*f* are configured as a permissioning hash tree in memory.

In certain examples, transaction identifiers 218*a*-218*h* in data sets are used to look up corresponding security node hash identifiers and the security node hash identifiers 222*a*-222*f* are used to look up corresponding security policies for the user access request. In some examples, data sets are organized in containers, in other examples, containers are not used. In certain examples, hash values are produced by performing a cryptographic one-way hash operation on a concatenation of a data set identifier and security node hash identifiers of all directly dependent security nodes. In one example, the security node hash identifiers embed the policy inheritance chain from parent data resources and dependent data resources.

Other examples of dependencies and the generation of corresponding security node hash identifiers is also illustrated in FIG. 2. For example, container 206 is shown as being dependent on container 204 such that a data set represented by DATA SET C ID 214 is dependent on the data set represented by DATA SET B ID 212 via a transform operation shown as 226*b*. Container 208 is shown to be a parent or root container having a raw DATA SET D ID 216 which is generated using TXN6 218*f*. The data set identified by the DATA SET D ID 216 is used as input for the transaction TXN7 218*g* such that the transaction TXN7 218*g* generates a data set, for example, that depends on the data set of container 208 and container 204 and because container 204 is dependent on container 208, the security node hash identifier SN2' is generated by taking the hash of the DATA SET B ID 212 concatenated with the security node hash identifier 222*a* and 222*d* as represented by SN2'(TXN7) =HASH(DATA SET B ID, SN1, SN4).

As illustrated, TXN8 218*h* depends on the data set from TXN7 218*g* as shown by transform operation 226*d*. The security node hash identifier 222*f* for this transaction is illustrated as (SN3'). The security node hash generator 220, in one example, is implemented as one or more processors that execute instructions that are stored in a non-transitory storage medium such that when the one or more processors executes the code, the one or more processors perform the operations described herein. Also, in this example, the cryptographic hash engine 224 performs in one example a one-way hash operation, although any suitable hash operation may be employed. In one implementation, the one-way hash operation uses an SHA-256 hash function. The data sets corresponding to the various data resource identifiers in one example are stored in the resource database 116, however any suitable storage structure may be employed.

Figure 3:
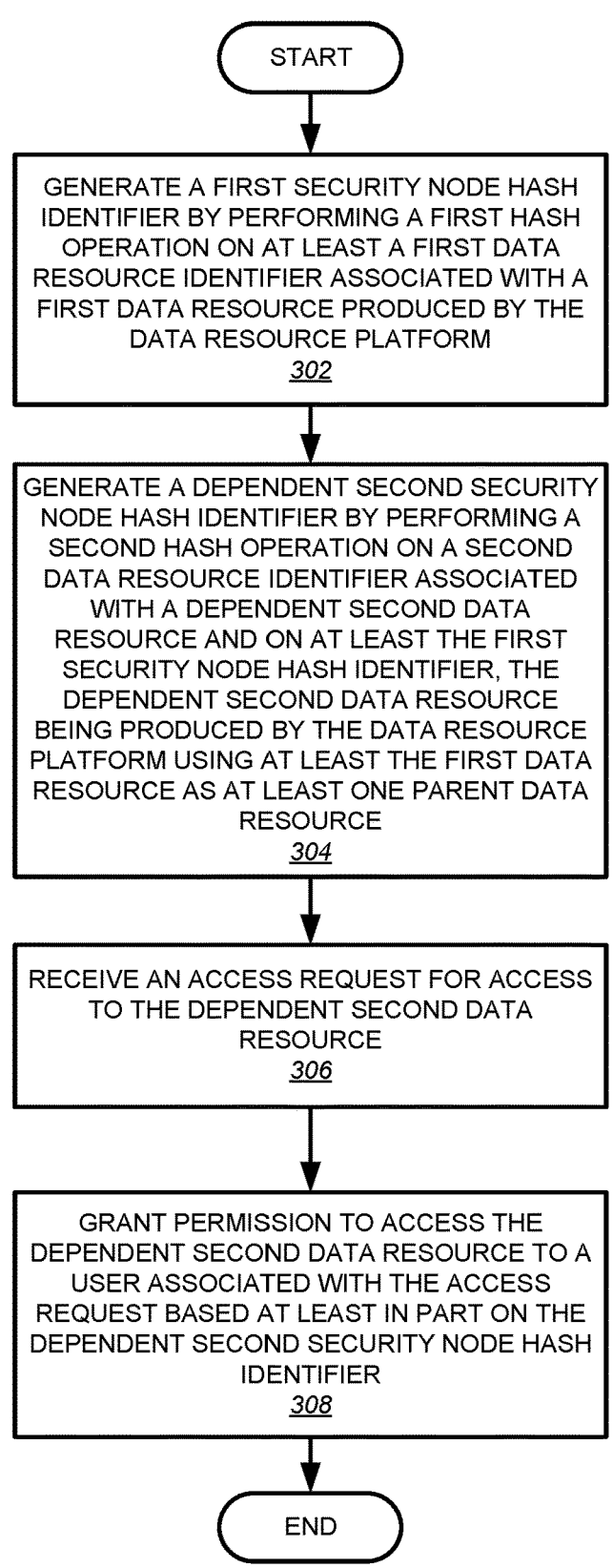
FIG. 3 is a flowchart illustrating a method for providing network-based permissioning using security node hash identifiers in accordance with one example set forth in the disclosure.

FIG. 3 is a flowchart illustrating a method 300 for providing network-based permissioning for a data resource platform according to one embodiment of the present disclosure. This diagram is merely an example, which should not unduly limit the scope of the claims. One of ordinary skill in the art would recognize many variations, alternatives, and modifications. In some examples, the method is performed by the network-based permissioning system 104. As shown in block 302, the method includes generating a security node hash identifier, such as security node hash identifier 222*a* by performing a hash operation on a data resource identifier, such as DATA SET A ID, associated with a data resource produced by the data resource platform. For example, a data resource, such as a data set as produced by the data processing platform 102 has a resource identifier associated therewith, such as data resource identifier 210. The cryptographic hash engine 224 performs, in one example, a one-way hash operation on the data resource identifier 210, DATA SET A ID, resulting in a security node hash identifier 222*a* (SN1) for a raw data set. As shown in block 304, the method includes generating a dependent second security node hash identifier, such as security node hash identifier 222*b* (SN2) by performing a hash operation on a data resource identifier 212, DATA SET B ID, as associated with a dependent second data resource, in this case a data set that depends from the data set from the parent container 202. In one example, the security node hash identifier 222*b* is generated by performing a hash operation on the concatenation of the data resource identifier 212 and on the security node hash identifier 222*a* (SN1). The dependent second data resource such as a data set identified by DATA SET B ID, is produced by the data resource platform through any suitable transformation using the data resource, in this example, a parent data set identified by DATA SET A ID in parent container 202.

As shown in block 306, the method includes receiving an access request such as a user access request, for access to the dependent data source, namely the data set identified by DATA SET B ID, in this example. The access request may be received by the network-based permission system through any suitable mechanism including one or more applications requesting access to the dependent data resource or in any other suitable manner. As shown in block 308, the method includes granting permission to access the dependent data resource to a user based at least in part on the dependent second security node hash identifier 222*b* SN2. For example, although the data set associated with DATA SET B ID is dependent on DATA SET A ID, the network-based permissioning system does not need to evaluate policies associated with DATA SET A ID and instead the hash operation serves as a type of automatic linking of prior security policies that were associated with DATA SET A ID. For example, in one example, because a user has permission to access raw data sets, any dependencies from those data sets will have the same policy as represented by the hash value of previous security node hash IDs.

In some examples, the network-based permissioning system 104 inserts a data structure in memory such as the resource database 116, that includes a hierarchical resource graph that includes nodes identified by the security node hash identifiers and dependent security node hash identifiers associated with the dependent second set. In some implementations, the network-based permissioning system stores the security node hash identifiers SN1, SN2, SN3, SN3', SN4, SN2' in a hierarchical format.

In certain implementations, each security node hash identifier has a security policy associated therewith. In one example, the security policy is stored in a lookup table such that each security node hash identifier has one or more corresponding policies linked thereto. In one implementation, the data resource identifiers are data set identifiers wherein some of the data set identifiers identify dependent data sets. For example, DATA SET B ID is dependent on DATA SET A ID whereas DATA SET C ID is dependent on DATA SET B ID and DATA SET D ID is a raw data set as is DATA SET A ID 210. When a security node hash identifier is generated, a security policy is also associated therewith to, for example, linking through a lookup table, or any other suitable mechanism. In one example, the policy of the parent is propagated by virtue of the hash operation to dependent nodes.

In the example where a data set is derived from multiple parent data resources, such as the example where TXN7 218g is dependent on DATA SET D ID which is a parent data set as well as being dependent on DATA SET A ID, the security hash identifier 222e (SN2') is generated by performing a hash operation on a parent data resource ID such as DATA SET D ID to generate security node hash identifier 222d (SN4). The method also includes generating a dependent security node hash identifier by performing a hash operation on the data resource identifier, namely DATA SET B ID, the security node hash identifier 222a (SN1) and the security node hash identifier 222d (SN4). This is shown by security node hash identifier 222e (SN2').

In some implementations, each security node hash identifier has an associated security policy. In some implementations, the security policy from the parent data set is inherited by the dependent data set so that a single lookup using the security node hash identifier in a lookup table points to the security policy of the parent. In other implementations, a lookup table is populated by the network-based permissioning system such that each security node hash identifier has a corresponding policy (see for example, FIG. 4).

In some implementations, where two levels of dependencies occur, a one-way hash operation is performed on a data set identifier that uniquely identifies another dependent data set and on a security node hash identifier. The security policy that is associated with the security node hash identifier, in some implementations, is the same security policy from the security node from which it directly depends. Referring again to FIG. 2, where the DATA SET C ID depends on DATA SET B ID which depends on DATA SET A ID, the security node hash identifier 222c (SN3) is generated by taking the hash of the concatenation of the DATA SET C ID and the security node hash identifier 222b (SN2). It will be recognized that any suitable number of dependencies may be employed.

In some implementations, for a new data set that is created, such as a parent data set or dependent data set, the method includes generating a security node hash identifier associated with the new data set by performing a cryptographic one-way hash operation on a concatenation of a data set identifier assigned to the new data set and security node hash identifiers of all directly dependent security node hash identifiers corresponding to data sets upon which the new data set directly depends. Although the above has been shown using a selected group of processes for the method, there can be many alternatives, modifications, and variations. For example, some of the processes may be expanded and/or combined. Other processes may be inserted into those noted above. Depending upon the embodiment, the sequence of processes may be interchanged with others replaced. Although the above has been shown using a selected group of processes for the method, there can be many alternatives, modifications and variations. For example, some of the processes may be expanded and/or combined. Other processes may be inserted in to those noted above. Depending upon the embodiment, the sequence of processes may be interchanged with others replaced.

In some embodiments, some or all processes (e.g., steps) of the method 300 are performed by the network-based permissioning system 104. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

Figure 4:
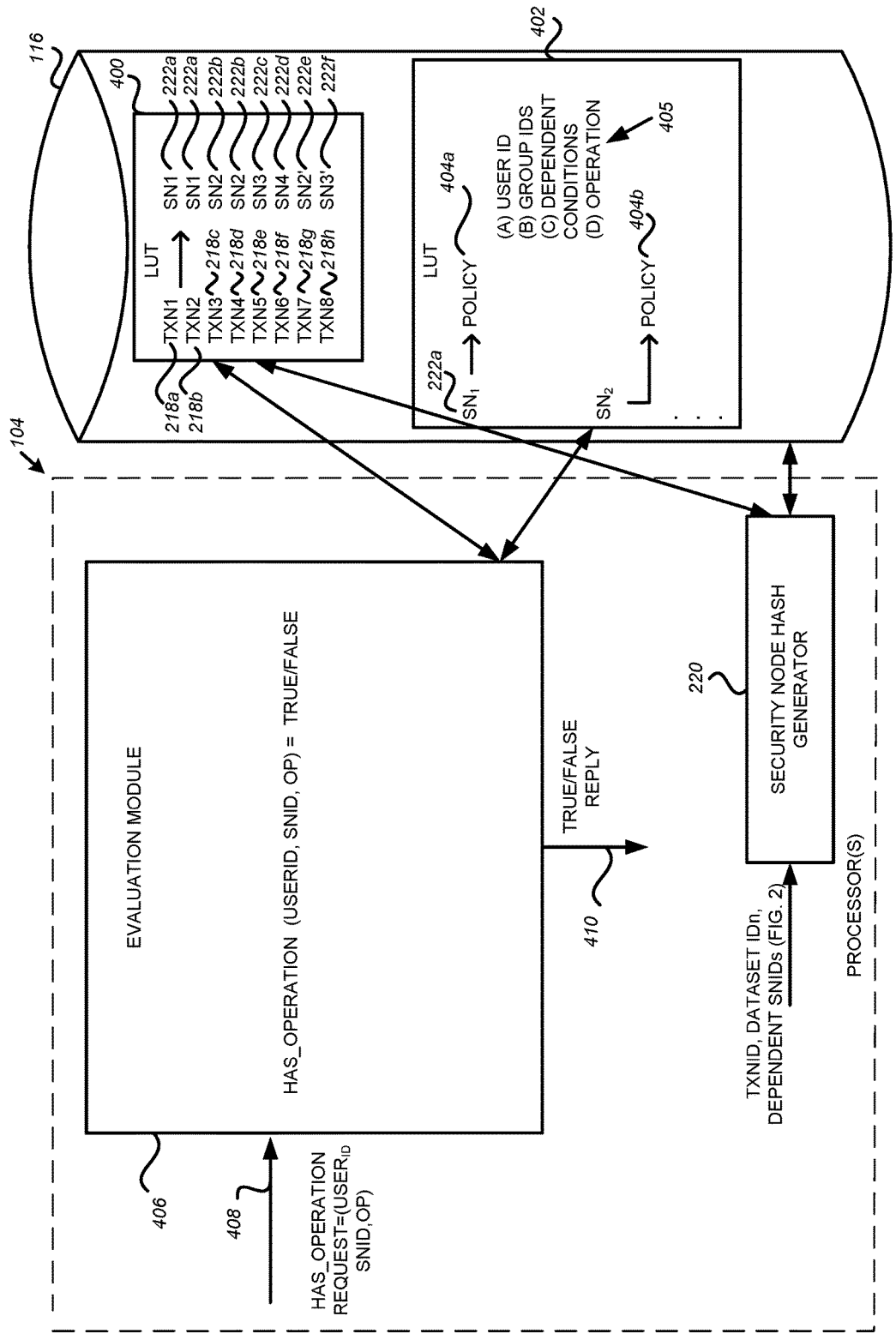
FIG. 4 is a block diagram illustrating various components of the network-based permissioning system which is provided as part of a network system, in accordance with some examples set forth in the disclosure.

FIG. 4 illustrates one example of the permissioning system 104 and resource database 116 that includes one or more lookup tables that are employed to determine whether to grant user permission in response to a permission access request. As previously noted, the security node hash generator 220 generates the security node hash identifiers 222a-222f and stores them or indexes to them as entries in memory, such as resource database 116. In one example, the security node hash identifiers are inserted into lookup tables 400 and 402. For example, the security node hash generator 220, or other component, stores in lookup table 400 a link between each transaction 218a-218h and corresponding security node hash identifiers 222a-222f It will be recognized however that any suitable linking mechanism may be employed and that other linking mechanisms other than, for example, the transaction identifiers may be used to index security node hash identifiers for particular data sets or containers. When a transaction level lookup is desired, the evaluation module looks up the transaction in the lookup table 400 and finds the corresponding security node hash identifier then uses lookup table 402 to find the corresponding policy for the security node hash identifier.

In certain implementations, lookup table 402 includes table entries that have data representing security node hash identifiers 222a-222f, in this example. Each of the security node hash identifiers 222a-222f are linked to corresponding policies 404a-404f (although only 404a and 404b are shown). The network-based permissioning system stores, in one example, for each security node hash identifier, a corresponding security policy that includes data representing user identifiers of users permissioned to perform one or more operations on the data set, approve dependency conditions with other data sets and one or more group identifiers to which a user belongs. However, it will be recognized that the lookup tables 400 and 402 can be configured as one or more tables, or any other suitable format as desired. As used herein a policy may include data representing one or more policies and that an index to one or more policies may be employed. In this example, each policy includes data representing a user ID and in some examples group identifiers as well as dependent conditions that must be met in order to grant permission. In some examples, the network-based permission system stores for each security node hash identifier, a corresponding security policy that includes data 405 representing user identifiers of users permissioned to perform one or more operations on the data set, approved operations, approved dependency conditions with other data sets and one or more group identifiers to which a user belongs. In certain examples, the network-based permission system creates new security node hash identifiers when inputs to a prior data set change.

In some implementations, a policy may be implemented as one or more conditions. In some implementations a policy can be implemented as a policy object or other structure that can include a set of ordered or unordered statements. A statement can include an action, condition and operation. An action can define the behavior associated with a statement. The condition is used to determine application of the action to the operation. The operation is the operation affected by the statement. The action, for example, may specify that the user is either allowed or denied performing the operation based on whether the condition is satisfied. Conditions that may be allowed can include reading, writing or viewing operations associated with a data set. Any other suitable conditions may also be employed. Any other suitable format for policy objects may also be employed. In one example, a policy for a dependent security node hash identifier is inherited from the parent regardless of the number of dependencies. Where there are dependencies from multiple parents, an administrator can be asked to choose the appropriate policy that should be associated with a given security node hash identifier. Other conflict resolution mechanisms may also be employed.

In certain implementations, the network-based permissioning system 104 includes an evaluation module 406 that evaluates an access request 408 and returns a reply 410 granting or denying requested permission to the requested resource. The evaluation module 406 like the security node hash generator 220 in one example is implemented as one or more processors executing stored instructions that are stored in memory that when executed, causes the one or more processors to operate as described herein. Permission is granted to a user by comparing a received security node hash from the access request, to the stored security node hash identifiers in the lookup tables 400 and 402. As such, the evaluation module 406 serves as a type of comparator to compare incoming access request information to stored security node hash identifier and policy information.

In some implementations, a user access request 408 is received by the network-based permissioning system such that an access request includes a requesting user identifier such as a unique user ID or other suitable user identifier, a dependent security node hash identifier and a requested permission condition. In one example, a has_Operation request is provided to the evaluation module 406. The has_Operation request includes a user ID, a security node hash identifier corresponding to the data resource that the user wishes to access and a requested operation. For example, each user has a unique identifier, the security node hash identifier may correspond to 222b (SN2) corresponding to data set associated with DATA SET B ID and the operation that the user wishes to perform on the data set may be a read, write, view or other operation.

In certain implementations, to evaluate the requesting user's access permission for a particular data resource, the evaluation module 406 performs a lookup operation in lookup table 402. In some implementations, the evaluation module 406 searches the lookup table 402 for a security node hash identifier that matches the security node hash identifier in the access request. If not found, the evaluation module returns a negative or "false" reply 410 denying permission to the access request 408. However, if the security node hash identifier that is received in the access request 408 matches a security node hash identifier in the lookup table 402, the evaluation module looks to see if the received user ID in the access request matches the stored user ID associated with the policy for the corresponding security node hash identifier. If the user ID matches, the evaluation module determines if the requested operation in the access request matches an allowable operation for the particular user according to the policy. If the operation that is requested matches an approved operation, the evaluation module issues a positive or "true" reply 410 to the access request 408 and the user is granted access to the requested data resource and is allowed to perform the requested operation. However, if the requested operation does not match the stored operation corresponding to the policy, then the access request is denied. In other implementations, the evaluation module searches on a transaction level first using the lookup table 400 to locate the appropriate security node hash identifier in lookup table 402.

FIG. 5 is a block diagram illustrating one example of a method 500 for providing network-based permissioning for a data resource platform carried out by the permissioning system 104. This diagram is merely an example, which should not unduly limit the scope of the claims. One of ordinary skill in the art would recognize many variations, alternatives, and modifications. As shown in block 502, the method includes generating a security node hash identifier associated with one or more transactions associated with a data set identifier. As previously described, in one example, the security node hash generator 220 generates the various security node hash identifiers as the transactions are being completed or as the data sets are being generated. In other embodiments, the security node hash identifiers are generated in batch operations. As shown in block 504, the method includes storing a table such as lookup table 400 having entries identifying transaction identifiers and corresponding security node hash identifiers. In one example, the lookup table 402 is used to determine permissions based on transaction identifiers. As shown in block 506, the method includes storing table entries such as those in lookup table 400 that include data representing security node hash identifiers and corresponding policies wherein the policies include user identifiers, group identifiers and operations that are permitted for a particular user, including dependent conditions.

As shown in block 508, the method includes receiving an access request for access to a dependent data resource. As shown in block 510, the method includes granting permission to the user to access the dependent data resource based on the user ID, security node hash ID and a requested permission operation from the access request, when the table entries for the user ID, the security node hash ID and policy match those from the access request. Although the above has been shown using a selected group of processes for the method, there can be many alternatives, modifications, and variations. For example, some of the processes may be expanded and/or combined. Other processes may be inserted into those noted above. Depending upon the embodiment, the sequence of processes may be interchanged with others replaced. Although the above has been shown using a selected group of processes for the method, there can be many alternatives, modifications and variations. For example, some of the processes may be expanded and/or combined. Other processes may be inserted in to those noted above. Depending upon the embodiment, the sequence of processes may be interchanged with others replaced.

In some embodiments, some or all processes (e.g., steps) of the method 500 are performed by the network-based permissioning system 104. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

FIG. 6 is a simplified diagram showing a computing system for implementing a network-based permissioning system according to one embodiment of the present disclosure. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 300 and/or the method 500, are performed by the computing system 600. In some examples, the bus 602 is coupled to the processor 604, the display 606, the cursor control component 607, the input device 610, the main memory 612, the read only memory (ROM) 614, the storage unit 616, and/or the network interface 618. In certain examples, the network interface is coupled to a network 112. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to certain embodiments, a method for providing network-based permissioning for a data resource platform includes generating a first security node hash identifier by performing a first hash operation on at least a first data resource identifier associated with a first data resource produced by the data resource platform, generating a dependent second security node hash identifier by performing a second hash operation on a second data resource identifier associated with a dependent second data resource and on at least the first security node hash identifier, the dependent second data resource being produced by the data resource platform using at least the first data resource as at least one parent data resource, receiving an access request for access to the dependent second data resource and in response to the access request, granting permission to access the dependent second data resource to a user associated with the access request based at least in part on the dependent second security node hash identifier wherein the method is performed by one or more processors. For example, the method is implemented according to at least FIG. 1, FIG. 2, FIG. 3, FIG. 4, FIG. 5 and/or FIG. 6.

In some examples, the method includes generating a third security node hash identifier by performing a third hash operation on at least a third data resource identifier associated with a third data resource produced by the data resource platform, wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

In certain examples, the first data resource identifier is a first data set identifier that uniquely identifies a first data set and wherein generating the first security node hash identifier includes performing a one-way hash operation on at least the first data set identifier, the first security node hash identifier having a first security policy associated therewith and wherein the second data resource identifier is a second data set identifier that uniquely identifies a dependent second data set and wherein generating the dependent second security node hash identifier includes performing a one-way hash operation on the second data set identifier and on at least the first security node hash identifier, the dependent second security node hash identifier having a second security policy associated therewith and wherein granting permission to access the dependent second data resource to the user is based at least in part on the second security policy.

In some examples, the access request includes receiving at least one requesting user identifier, receiving at least the dependent second security node hash identifier and receiving at least one requested permission condition, wherein the granting permission includes using the dependent second security node hash identifier to obtain the second security policy, wherein the second security policy includes at least one approved user identifier and at least one approved permission condition and granting permission to the user when the at least one approved user identifier matches the at least one requesting user identifier and the at least one requested permission condition matches the at least one approved permission condition.

In certain examples, the method includes inserting a data structure in memory, the date structure includes a hierarchical resource graph that includes nodes identified by the first security node hash identifier and the dependent second security node hash identifier associated with the dependent second data set.

In some examples, the method includes generating and storing a third dependent security node hash identifier associated with a dependent third data set by performing a one-way hash operation on: a third data set identifier that uniquely identifies the dependent third data set and on at least the second security node hash identifier, the dependent third security node hash identifier having a third security policy associated therewith, wherein the dependent third data set is produced by the data resource platform using at least the dependent second data set.

In certain examples, the method includes generating for a new data set that is created, a security node hash identifier associated with the new data set by performing a cryptographic one-way hash operation on a concatenation of a data set identifier assigned to the new data set and security node hash identifiers of all directly dependent security node hash identifiers corresponding to data sets upon which the new data set directly depends.

In some examples, the method includes storing the dependent second security node hash identifier as a linked element to the second security policy and wherein the second security policy includes the first security policy and wherein the granting permission to access the dependent second data resource based at least in part on the second security policy comprises comparing a security node hash identifier associated with the access request to the stored dependent security node hash identifier.

According to certain implementations, a system for providing network-based permissioning for a data resource platform includes one or more processors of a machine, a first non-transitory machine-readable medium storing executable instructions that when executed cause the one or more processors to generate a first security node hash identifier by performing a first hash operation on at least a first data resource identifier associated with a first data resource produced by the data resource platform, generate a dependent second security node hash identifier by performing a second hash operation on a second data resource identifier associated with a dependent second data resource and on at least the first security node hash identifier, the dependent second data resource being produced by the data resource platform using at least the first data resource as at least one parent data resource, receive an access request for access to the dependent second data resource and in response to the access request, grant permission to access the dependent second data resource to a user associated with the access request, based at least in part on the dependent second security node hash identifier. For example, the method is implemented according to at least FIG. 1, FIG. 2, FIG. 3, FIG. 4, FIG. 5 and/or FIG. 6.

In some examples, the first non-transitory machine-readable medium stores executable instructions that when executed cause the one or more processors to generate a third security node hash identifier by performing a third hash operation on at least a third data resource identifier associated with a third data resource produced by the data resource platform, wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

In certain examples, the first data resource identifier is a first data set identifier that uniquely identifies a first data set, wherein the second data resource identifier is a second data set identifier that uniquely identifies a dependent second data set and wherein the first non-transitory machine-readable medium stores executable instructions that when executed cause the one or more processors to generate the first security node hash identifier associated with at least the first data set identifier by performing a one-way hash operation on at least the first data set identifier, the first security node hash identifier having a first security policy associated therewith, generate the dependent second security node hash identifier by performing a one-way hash operation on the second data set identifier that uniquely identifies the dependent second data set and on at least the first security node hash identifier, the dependent second security node hash identifier having a second security policy associated therewith, and store the first security node hash identifier and the dependent second security node hash identifier.

In some examples, the first non-transitory machine-readable medium stores executable instructions that when executed cause the one or more processors to receive the access request that includes at least one requesting user identifier, at least the dependent second security node hash identifier and at least one requested permission condition, grant the permission operation by using the dependent second security node hash identifier to obtain the second security policy, wherein the second security policy includes at least one approved user identifier and at least one approved permission condition and grant the permission operation when the at least one approved user identifier matches the at least one requesting user identifier and the at least one requested permission condition matches the at least one approved permission condition.

In certain examples, the first non-transitory machine-readable medium stores executable instructions that when executed cause the one or more processors to generate a third dependent security node hash identifier associated with a dependent third data set, by performing a one-way hash operation on: a third data set identifier that uniquely identifies the dependent third data set and on at least the second security node hash identifier, the dependent third security node hash identifier having a third security policy associated therewith and store the third dependent security node hash identifier, wherein the dependent third data set is produced by the one or more processors using at least the dependent second data set.

In some examples, the system includes a second non-transitory machine-readable medium and wherein the one or more processors stores the first security node hash identifier and the dependent second security node hash identifier as part of a hierarchical resource graph that includes data resource nodes.

According to certain implementations, a non-transitory machine-readable medium includes executable instructions that when executed by one or more processors cause the one or more processors to generate a first security node hash identifier by performing a first hash operation on at least a first data resource identifier associated with a first data resource produced by the data resource platform, generate a dependent second security node hash identifier by performing a second hash operation on a second data resource identifier associated with a dependent second data resource and on at least the first security node hash identifier, the dependent second data resource being produced by the data resource platform using at least the first data resource as at least one parent data resource, receive an access request for access to the dependent second data resource, and in response to the access request, grant permission to access the dependent second data resource to a user associated with the access request, based at least in part on the dependent second security node hash identifier. For example, the method is implemented according to at least FIG. 1, FIG. 2, FIG. 3, FIG. 4, FIG. 5 and/or FIG. 6.

In some examples, the non-transitory machine-readable medium includes executable instructions that when executed cause the one or more processors to generate a third security node hash identifier by performing a third hash operation on at least a third data resource identifier associated with a third data resource produced by the data resource platform, wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

In certain examples, the first data resource identifier is a first data set identifier that uniquely identifies a first data set, wherein the second data resource identifier is a second data set identifier that uniquely identifies a dependent second data set and wherein the non-transitory storage medium stores executable instructions that when executed cause the one or more processors to generate the first security node hash identifier associated with at least the first data set identifier by performing a one-way hash operation on at least the first data set identifier, the first security node hash identifier having a first security policy associated therewith, generate the dependent second security node hash identifier by performing a one-way hash operation on the second data set identifier that uniquely identifies the dependent second data set and on at least the first security node hash identifier, the dependent second security node hash identifier having a second security policy associated therewith and store the first security node hash identifier and the dependent second security node hash identifier.

In some examples, the non-transitory machine-readable medium includes executable instructions that when executed cause the one or more processors to receive the access request that includes at least one requesting user identifier, at least the dependent second security node hash identifier and at least one requested permission condition, grant the permission operation by using the dependent second security node hash identifier to obtain the second security policy, wherein the second security policy includes at least one approved user identifier and at least one approved permission condition, and grant the permission operation when the at least one approved user identifier matches the at least one requesting user identifier and the at least one requested permission condition matches the at least one approved permission condition.

In certain examples, the non-transitory machine-readable medium includes executable instructions that when executed cause the one or more processors to generate a third dependent security node hash identifier associated with a dependent third data set, by performing a one-way hash operation on: a third data set identifier that uniquely identifies the dependent third data set and on at least the second security node hash identifier, the dependent third security node hash identifier having a third security policy associated therewith and store the third dependent security node hash identifier, wherein the dependent third data set is produced by the one or more processors using at least the dependent second data set.

In some examples, the non-transitory machine-readable medium includes executable instructions that causes the one or more processors to store the first security node hash identifier and the dependent second security node hash identifier as part of a hierarchical resource graph that includes data resource nodes.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing network-based permissioning for a data resource platform comprising:
generating a first security node hash identifier by performing a first hash operation on at least a first data resource identifier associated with a first data resource that comprises a first data set produced by the data resource platform;
generating a dependent second security node hash identifier by performing a second hash operation on a second data resource identifier associated with a dependent second data resource and on at least the first security node hash identifier, the dependent second data resource that comprises a dependent second data set being produced by the data resource platform using at least the first data resource as at least one parent data resource;
receiving an access request for access to the dependent second data resource; and
in response to the access request, granting permission to access the dependent second data resource to a user associated with the access request based at least in part on the dependent second security node hash identifier matching a dependent second security node hash identifier that is associated with the access request;
wherein the method is performed by one or more processors.

2. The method of claim 1 further comprising:
generating a third security node hash identifier by performing a third hash operation on at least a third data resource identifier associated with a third data resource produced by the data resource platform;
wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

3. The method of claim 1 wherein the first data resource identifier is a first data set identifier that uniquely identifies the first data set and wherein generating the first security node hash identifier comprises performing a one-way hash operation on at least the first data set identifier, the first security node hash identifier having a first security policy associated therewith; and
wherein the second data resource identifier is a second data set identifier that uniquely identifies the dependent second data set and wherein generating the dependent second security node hash identifier comprises performing a one-way hash operation on the second data set identifier and on at least the first security node hash identifier, the dependent second security node hash identifier having a second security policy associated therewith;
and wherein granting permission to access the dependent second data resource to the user is based at least in part on the second security policy.

4. The method of claim 3 wherein the receiving the access request comprises:
receiving at least one requesting user identifier, receiving at least the dependent second security node hash identifier and receiving at least one requested permission condition;
wherein the granting permission comprises:
using the dependent second security node hash identifier to obtain the second security policy, wherein the second security policy comprises at least one approved user identifier and at least one approved permission condition; and
granting permission to the user when the at least one approved user identifier matches the at least one requesting user identifier and the at least one requested permission condition matches the at least one approved permission condition.

5. The method of claim 3 further comprising inserting a data structure in memory, the date structure comprising a hierarchical resource graph that comprises nodes identified by the first security node hash identifier and the dependent second security node hash identifier associated with the dependent second data set.

6. The method of claim 3 further comprising generating and storing a third dependent security node hash identifier associated with a dependent third data set by performing a one-way hash operation on: a third data set identifier that uniquely identifies the dependent third data set and on at least the second security node hash identifier, the dependent third security node hash identifier having a third security policy associated therewith;

wherein the dependent third data set is produced by the data resource platform using at least the dependent second data set.

7. The method of claim 3 comprising generating for a new data set that is created, a security node hash identifier associated with the new data set by performing a cryptographic one-way hash operation on a concatenation of a data set identifier assigned to the new data set and security node hash identifiers of all directly dependent security node hash identifiers corresponding to data sets upon which the new data set directly depends.

8. The method of claim 3 comprising storing the dependent second security node hash identifier as a linked element to the second security policy and wherein the second security policy comprises the first security policy and wherein the granting permission to access the dependent second data resource based at least in part on the second security policy comprises comparing a security node hash identifier associated with the access request to the stored dependent security node hash identifier.

9. A system for providing network-based permissioning for a data resource platform comprising:
one or more processors of a machine;
a first non-transitory machine-readable medium storing executable instructions that when executed cause the one or more processors to:
generate a first security node hash identifier by performing a first hash operation on at least a first data resource identifier associated with a first data resource that comprises a first data set produced by the data resource platform;
generate a dependent second security node hash identifier by performing a second hash operation on a second data resource identifier associated with a dependent second data resource and on at least the first security node hash identifier, the dependent second data resource that comprises a dependent second data set being produced by the data resource platform using at least the first data resource as at least one parent data resource;
receive an access request for access to the dependent second data resource; and
in response to the access request, grant permission to access the dependent second data resource to a user associated with the access request, based at least in part on the dependent second security node hash identifier matching a dependent second security node hash identifier that is associated with the access request.

10. The system of claim 9 wherein the first non-transitory machine-readable medium stores executable instructions that when executed cause the one or more processors to generate a third security node hash identifier by performing a third hash operation on at least a third data resource identifier associated with a third data resource produced by the data resource platform;
wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

11. The system of claim 9 wherein the first data resource identifier is a first data set identifier that uniquely identifies the first data set, wherein the second data resource identifier is a second data set identifier that uniquely identifies the dependent second data set and wherein the first non-transitory machine-readable medium stores executable instructions that when executed cause the one or more processors to:
generate the first security node hash identifier associated with at least the first data set identifier by performing a one-way hash operation on at least the first data set identifier, the first security node hash identifier having a first security policy associated therewith;
generate the dependent second security node hash identifier by performing a one-way hash operation on the second data set identifier that uniquely identifies the dependent second data set and on at least the first security node hash identifier, the dependent second security node hash identifier having a second security policy associated therewith; and
store the first security node hash identifier and the dependent second security node hash identifier.

12. The system of claim 11 wherein the first non-transitory machine-readable medium stores executable instructions that when executed cause the one or more processors to:
receive the access request that includes at least one requesting user identifier, at least the dependent second security node hash identifier and at least one requested permission condition;
grant the permission operation by using the dependent second security node hash identifier to obtain the second security policy, wherein the second security policy comprises at least one approved user identifier and at least one approved permission condition; and
grant the permission operation when the at least one approved user identifier matches the at least one requesting user identifier and the at least one requested permission condition matches the at least one approved permission condition.

13. The system of claim 9 wherein the first non-transitory machine-readable medium stores executable instructions that when executed cause the one or more processors to:
generate a third dependent security node hash identifier associated with a dependent third data set, by performing a one-way hash operation on: a third data set identifier that uniquely identifies the dependent third data set and on at least the second security node hash identifier, the dependent third security node hash identifier having a third security policy associated therewith; and
store the third dependent security node hash identifier,
wherein the dependent third data set is produced by the one or more processors using at least the dependent second data set.

14. The system of claim 9 comprising a second non-transitory machine-readable medium and wherein the one or more processors stores the first security node hash identifier and the dependent second security node hash identifier as part of a hierarchical resource graph that comprises data resource nodes.

15. A non-transitory machine-readable medium comprising executable instructions that when executed by one or more processors cause the one or more processors to:
generate a first security node hash identifier by performing a first hash operation on at least a first data resource identifier associated with a first data resource that comprises a first data set produced by the data resource platform;

generate a dependent second security node hash identifier by performing a second hash operation on a second data resource identifier associated with a dependent second data resource and on at least the first security node hash identifier, the dependent second data resource that comprises a dependent second data set being produced by the data resource platform using at least the first data resource as at least one parent data resource;

receive an access request for access to the dependent second data resource; and in response to the access request, grant permission to access the dependent second data resource to a user associated with the access request, based at least in part on the dependent second security node hash identifier matching a dependent second security node hash identifier that is associated with the access request.

16. The non-transitory machine-readable medium of claim 15 comprising executable instructions that when executed cause the one or more processors to:

generate a third security node hash identifier by performing a third hash operation on at least a third data resource identifier associated with a third data resource produced by the data resource platform;

wherein the performing the second hash operation on the second data resource identifier associated with the dependent second data resource and on at least the first security node hash identifier includes performing the second hash operation on the second data resource identifier and on at least the first security node hash identifier and the third security node hash identifier, the dependent second data resource being produced by the data resource platform using at least the first data resource and the third data resource as at least two parent data resources.

17. The non-transitory machine-readable medium of claim 15 wherein the first data resource identifier is a first data set identifier that uniquely identifies the first data set, wherein the second data resource identifier is a second data set identifier that uniquely identifies the dependent second data set and wherein the non-transitory storage medium stores executable instructions that when executed cause the one or more processors to:

generate the first security node hash identifier associated with at least the first data set identifier by performing a one-way hash operation on at least the first data set identifier, the first security node hash identifier having a first security policy associated therewith;

generate the dependent second security node hash identifier by performing a one-way hash operation on the second data set identifier that uniquely identifies the dependent second data set and on at least the first security node hash identifier, the dependent second security node hash identifier having a second security policy associated therewith; and store the first security node hash identifier and the dependent second security node hash identifier.

18. The non-transitory machine-readable medium of claim 17 comprising executable instructions that when executed cause the one or more processors to:

receive the access request that includes at least one requesting user identifier, at least the dependent second security node hash identifier and at least one requested permission condition;

grant the permission operation by using the dependent second security node hash identifier to obtain the second security policy, wherein the second security policy comprises at least one approved user identifier and at least one approved permission condition; and grant the permission operation when the at least one approved user identifier matches the at least one requesting user identifier and the at least one requested permission condition matches the at least one approved permission condition.

19. The non-transitory machine-readable medium of claim 15 comprising executable instructions that when executed cause the one or more processors to:

generate a third dependent security node hash identifier associated with a dependent third data set, by performing a one-way hash operation on: a third data set identifier that uniquely identifies the dependent third data set and on at least the second security node hash identifier, the dependent third security node hash identifier having a third security policy associated therewith; and store the third dependent security node hash identifier, wherein the dependent third data set is produced by the one or more processors using at least the dependent second data set.

20. The non-transitory machine-readable medium of claim 15 comprising executable instructions that causes the one or more processors to store the first security node hash identifier and the dependent second security node hash identifier as part of a hierarchical resource graph that comprises data resource nodes.

* * * * *